(No Model.)
L. H. NASH.
WATER METER.
No. 561,060. Patented May 26, 1896.
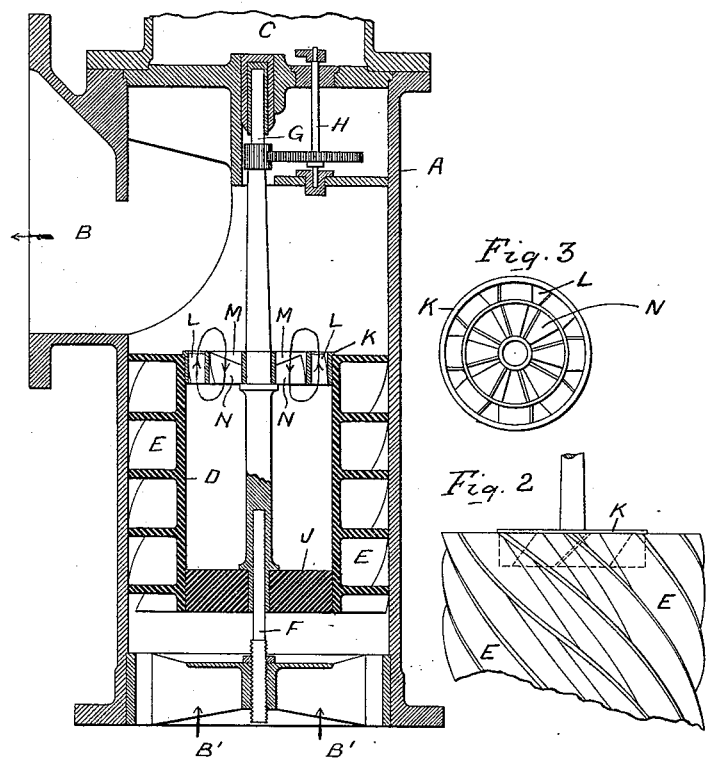
WITNESSES:
D. P. Cowl
Louis N. Lee
INVENTOR
Lewis Hallock Nash
BY
Johnson & Johnson
ATTORNEYS

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

WATER-METER.

SPECIFICATION forming part of Letters Patent No. 561,060, dated May 26, 1896.

Application filed July 5, 1894. Serial No. 516,568. (No model.)

*To all whom it may concern:*

Be it known that I, LEWIS HALLOCK NASH, a citizen of the United States, and a resident of South Norwalk, in the county of Fairfield and State of Connecticut, have invented certain new and useful Improvements in Water-Meters, of which the following is a specification.

My present invention relates more particularly to that class of water-meters known as "inferential" or "current" meters; and it consists of certain novel parts and combinations of parts specifically pointed out in the concluding claims.

In the accompanying drawings, Figure 1 is a vertical section through a water-meter. Fig. 2 is a side view of a portion of the piston or moving part removed from the case. Fig. 3 is a top view of the same.

In the accompanying drawings I have shown my invention applied to a form of meter now well known in the art under the trade name of the "Gem" meter; but it will be understood that it is applicable to any other meter having, generally speaking, the same or a similar mode of action—that is to say, a meter which is operated by the flow of the current as distinguished from those meters which operate by displacement.

I will first briefly describe the construction of the meter shown.

A is the meter-casing, into which the water flows from a supply-pipe at the bottom and out into the service-pipe at the side, as indicated by the arrow B B'. The registering elements of the meter are not shown, but are located at the top of the casing C in the part broken away.

D is the part actuated by the passing current and is commonly called the "propeller." This propeller is provided with spiral flanges E E, closely approaching the sides of the casing A. It is journaled on spindles F and G of any suitable construction. The registering mechanism is connected with a spindle H, geared to the shaft of the propeller.

My present improvement consists in a device for preventing the racing of the piston under certain conditions, particularly those resulting from the passage of irregular, intermittent, or pulsating currents of water. Its object is to promptly arrest or diminish the revolution of the propeller when the passage of water is discontinued or suddenly diminished, and this result is accomplished by the application thereto of an automatically-operating brake.

The lower end of the drum of the propeller is closed by a head J. Its upper end is open, and hence the interior of the drum of the propeller is a water-chamber closed at one end and open at the other. Above this is placed the reaction device K. The motion of the propeller, owing to centrifugal force, causes a current to flow out through the passage L near the periphery of said wheel and inward through the passage M near the hub, as indicated by the arrows. One of these passages is, or both of them are, provided with vanes N, which direct the current so as to impinge upon the body of water above. The reaction due to this operates to retard or to stop the piston promptly when the flow of water through the device is diminished or stopped. While this action to a greater or less extent is continuous, the flow of the current exercises a force so much in excess of it that it does not interfere with the accurate operation of the meter under normal working conditions.

One of the advantages of the particular form of retarding device described is due to the fact that its effect increases as the velocity of the propeller increases, so that it provides a variable retarding effect more or less proportioned to requirements at all times.

In the foregoing specification I have not endeavored to suggest or describe the various modifications of which my invention is susceptible, the object of this specification being to instruct persons skilled in the art to practice the same in the form at present preferred by me and to enable them to understand its nature; but I desire it to be distinctly understood that my invention is not limited to the precise devices or combinations of devices shown, as various modifications may be made without departing from the spirit of my invention and without exceeding the scope of the claims concluding this specification.

All the elements in combination illustrated and above described are not essential to the several features of my invention, separately and broadly considered. This will be indicated in the concluding claims, where the omission of an element or the omission of reference to the detail features of the elements mentioned is intended to be a formal declaration of the fact that the omitted elements or features are not essential to the inventions therein severally covered.

Having thus described a structure involving in preferred form my present invention, what I claim, and desire to secure by Letters Patent, is—

1. In a water-meter the combination with a propeller operated by the flow of a current consisting of a central drum with a spirally-flanged exterior, of a retarding device composed of concentric rings provided with inclined vanes.

2. In a water-meter, the combination with a piston operated by the flow of current of a retarding device composed of vanes inclined so as to direct the water passing through them to impinge upon the main body of water passing through the meter.

3. In a water-meter, the combination with the piston of a chamber containing water open at one end provided with vanes arranged so as to cause water passing through them to impinge upon the main body of water passing through the meter.

4. In a water-meter the combination with a propeller operated by the current of retarding-vanes driven by said propeller operating in the main body of water passing through the meter, the plane of rotation of the vanes being at right angles to the flow of the current through the meter.

Signed at Brooklyn, in the county of Kings and State of New York, this 2d day of July, A. D. 1894.

LEWIS HALLOCK NASH.

Witnesses:
JOHN H. NORRIS,
CHAS. H. SERGEANT.